United States Patent [19]
Peilloud

[11] Patent Number: 5,195,382
[45] Date of Patent: Mar. 23, 1993

[54] DEVICE FOR MEASURING SPEED AND TORQUE ON A SHAFT

[75] Inventor: Fernand Peilloud, Cheran, France

[73] Assignee: The Torrington Company, Torrington, Conn.

[21] Appl. No.: 685,037

[22] Filed: Apr. 15, 1991

[30] Foreign Application Priority Data

Apr. 20, 1990 [FR] France ............... 90 05046

[51] Int. Cl.⁵ .................................... G01L 3/02
[52] U.S. Cl. .......................... 73/862.321; 324/209
[58] Field of Search .......... 73/862.08, 862.33, 862.34, 73/862.321, 862.325, 862.326; 324/207.21, 207.25, 209

[56] References Cited

U.S. PATENT DOCUMENTS

| | | | |
|---|---|---|---|
| 3,111,028 | 11/1963 | Lebow | 73/862.33 |
| 3,170,323 | 2/1965 | Kuhrt et al. | 324/207.2 |
| 3,307,164 | 2/1967 | Zimmer | 324/207.16 X |
| 3,742,243 | 6/1973 | Gamble | 73/519 X |
| 3,823,607 | 7/1974 | Rundell | 73/862.34 |
| 4,173,265 | 11/1979 | Kremer | 73/862.33 |
| 4,430,566 | 2/1984 | Searle | 73/862.33 |
| 4,448,084 | 5/1984 | Dobler et al. | 73/862.33 |
| 4,646,088 | 2/1987 | Inoue | 324/207.25 X |
| 4,724,710 | 2/1988 | Murty | 73/862.33 |
| 4,851,771 | 7/1989 | Ikeda et al. | 324/207.25 X |

FOREIGN PATENT DOCUMENTS 5927230 2/1984 Japan .

Primary Examiner—Herbert Goldstein
Assistant Examiner—Elizabeth L. Shopbell
Attorney, Agent, or Firm—John C. Bigler

[57] ABSTRACT

A device for measuring the torque of a shaft which uses two magnetic field sensors located between two coaxial magnetic encoders. The magnetic field sensors are angularly displaced by one-fourth of the period of magnetic field.

9 Claims, 3 Drawing Sheets

DEVICE FOR MEASURING SPEED AND TORQUE ON A SHAFT

BACKGROUND OF THE INVENTION

The invention relates generally to a device for measuring torque on a rotating shaft and more particularly to a device which measures the angular displacement of two magnets relative to each other. The invention also pertains to a device for measuring the rotational speed of the shaft and the power transmitted by it.

French Patent No. Fr-A-2,626,368 describes a device in which the angular position of two magnets is sensed by an "all or nothing" signal output sensor. The torsional moment of the shaft is determined from the phase shift of signals from the two sensors. This device does not, however, permit the measurement of the torque on a shaft even when the shaft is blocked or when its speed is changing.

The foregoing illustrates limitations known to exist in present torque sensors. Thus, it is apparent that it would be advantageous to provide an alternative directed to overcoming one or more of the limitations set forth above. Accordingly, a suitable alternative is provided, including features more fully disclosed hereinafter.

SUMMARY OF THE INVENTION

In one aspect of the present invention, this is accomplished by providing a device for measuring the torque of a shaft. The device uses two axially separated encoders fixed to the shaft and a pair of sensing elements. The sensing elements are angularly displaced one from the other.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
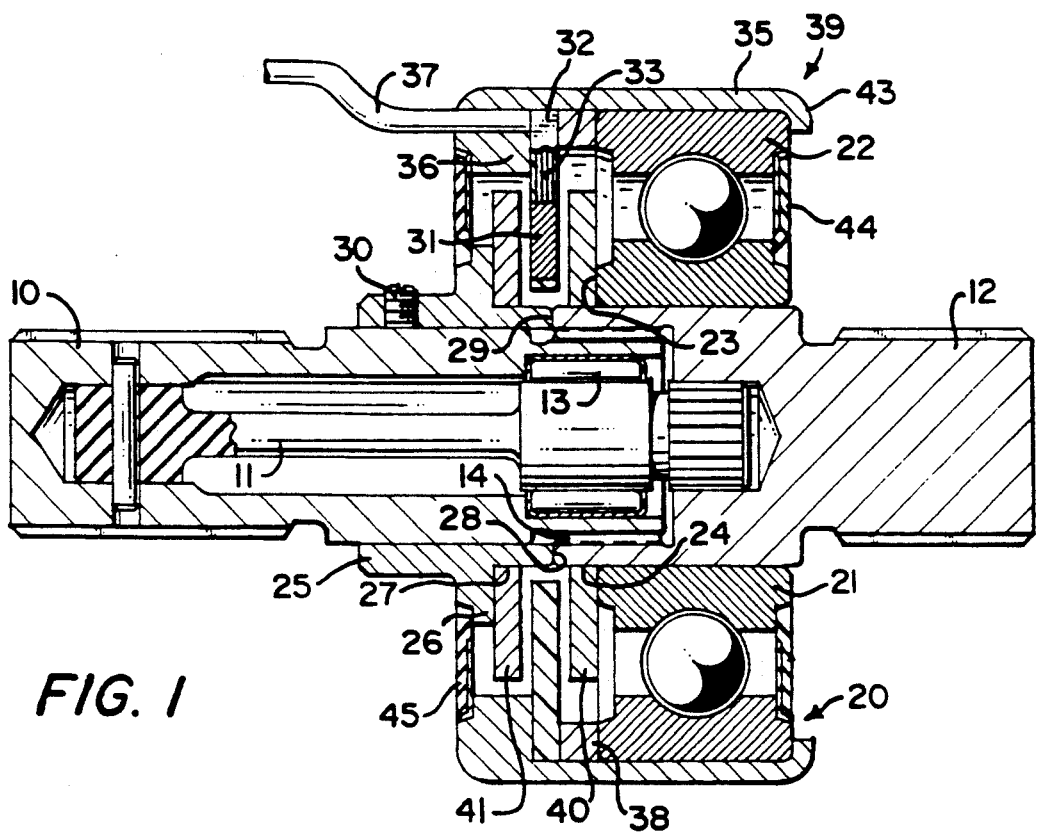
FIG. 1 is a longitudinal cross-sectional view of an assembly in which the device is used on a rotating shaft, including an elastic link formed by a torsion rod.

According to FIG. 1, an input shaft 10 is coupled to an output shaft 12 by means of a deformable elastic link or torque rod 11. The input shaft 10 is connected to a motor (not shown); the output shaft 12 is connected to a driven device (not shown). Torque rod 11, which is coaxial and concentric to shafts 10 and 12, permits the transmission of rotary motion from one shaft to the other. Torque rod 11 is deformed by torque when the driven device opposes the rotation imposed by the motor. The rotation of input shaft 10 is guided by a roller bearing 13 on a support of torque rod 11.

A grooved joint 14 is installed with an angular tolerance between input shaft 10 and output shaft 12. The grooved joint 14 makes possible the free angular displacement of torque rod 11 up to the tolerance of the joint. Beyond this angular value, input shaft 10 and output shaft 12 are in contact via the sides of the grooves and are directly linked in rotation.

A ball bearing 20 is mounted on the output shaft 12 and has an inner ring 21 and an outer ring 22. Inner surface 23 of inner ring 21 constitutes a support for an encoder 40, which is permanently connected to output shaft 12, by bonding it, for example, simultaneously to support surface 24 on shaft 12 and to surface 23 of ring 21. A housing 35 encloses the ball bearing 20. A sleeve 25, which is force-fit over input shaft 10, has a shoulder 26, which supports a second encoder 41, which is permanently connected to the sleeve 25 by bonding it, for example, simultaneously to shoulder 26 and support surface 27 machined on sleeve 25.

The encoders 40, 41 are multipolar magnets separated in part by the length of support surface 27 of sleeve 25. Surface 28 of the sleeve is in sliding contact with surface 29 on support 24 of the output shaft 12. Sleeve 25 is also provided with a locking element in the form of screw 30, which acts on input shaft 10.

A sensing means 31 is mounted on a support plate 32, which holds electronic components and connections 33. Support plate 32 is set into stationary housing 35 between a shoulder 36 of the stationary housing 35, which also has an opening for the passage of conductors 37, and an annular brace 38, which rests against the surface of outer ring 22 of bearing 20. Housing 35 encloses the assembly of encoders 40, 41, sensing means 31, and bearing 20. At one end 39, it has a turned edge 43 which retains bearing 20 in the axial direction. The housing 35 is sealed with seals 44, 45, mounted between ring 22 and ring 21 of the roller bearing and between housing 35 and sleeve 25, respectively, to seal housing 35.

Figure 2A:
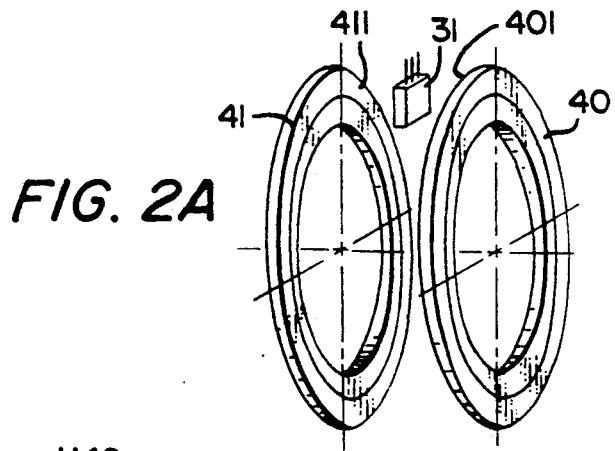
FIG. 2a is a simplified view of the torque measurement components.
Figure 2B:
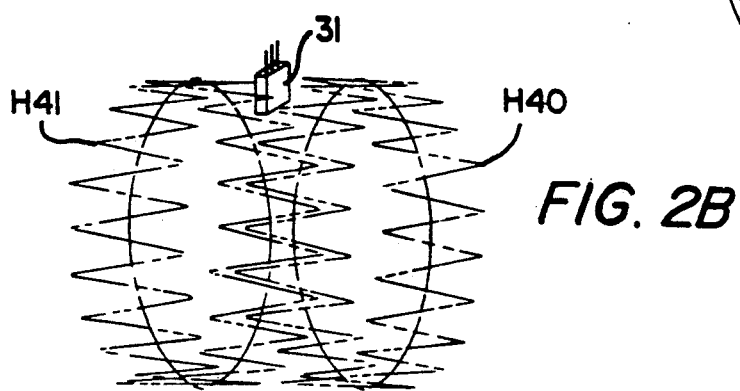
FIG. 2b illustrates the distribution of the magnetic fields in front of the sensing device.

FIG. 2a is a simplified view of the torque measurement components. Encoders 40, 41 are made of a ferromagnetic material such as a plastoferrite, consisting of ferromagnetic particles in a plastic binder. The encoders 40, 41 are magnetized in the same manner on surfaces 401, 411 by known multipolar magnetizing methods.

Encoder surfaces 401, 411 face one another. The sensing means 31 is between the two encoder surfaces 401, 411 without contacting either one of these surfaces. Each encoder 40, 41 generates a magnetic field H40, H41 in a direction perpendicular to surfaces 401, 411.

The magnetic field H40, H41 measured midway between surfaces 401, 411 in a direction perpendicular to said surfaces has the profile of a sinusoidal, cyclical function. Sensing means 31 measures the magnetic field resulting from the combination of magnetic fields H40, H41.

Figure 3:
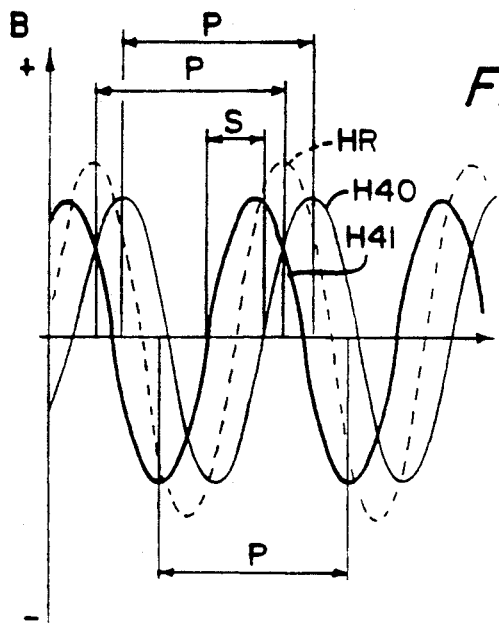
FIG. 3 is a diagram of the field resulting from the magnetic fields produced by the encoders.

FIG. 3 is an expanded representation of magnetic fields H40, H41, which are phase-shifted by a value of S at a measurement point situated mid-way between magnets 40, 41. The resultant magnetic field HR is equal to the algebraic sum of sinusoidal fields H40, H41. Field HR is a sinusoidal function of the same period P as the two fields H40, H41. The magnetic phase shift value S is adjusted initially by the rotation of sleeve 25 on input shaft 10. Lock screw 30 ensures that this initial adjustment is preserved.

Figure 4A:
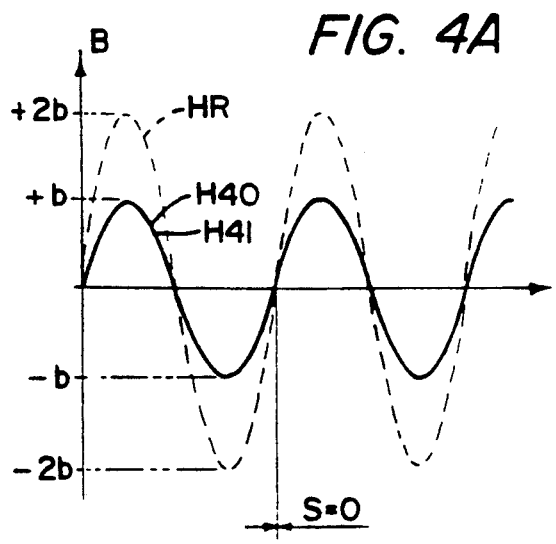
FIG. 4a is a diagram of the resulting field and of the magnetic fields when in phase.

FIG. 4a is an expanded representation of two magnetic fields H40, H41 in phase balance, i.e., when the phase shift S is zero. The resultant magnetic field HR then takes on a value equal to twice the value of one of the two component fields at any measurement point.

Figure 4B:
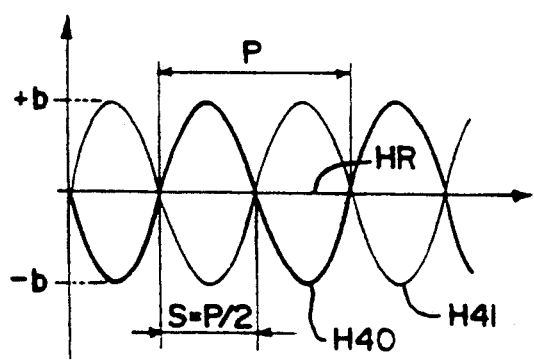
FIG. 4b is a diagram of the resulting field and of the magnetic fields when not in phase.

FIG. 4b is an expanded representation of the two magnetic fields H40, H41 in phase opposition, i.e., when the phase shift S is equal to a half-period of either of the two fields H40, H41. The resultant magnetic field HR then takes on a value of zero at any measurement point.

As a result of the adjustment of the magnetic phase shift to an initial value of zero, the application of torque between input shaft 10 and output shaft 12 involves an angular displacement of encoders 40, 41 by way of torque rod 11. This angular displacement leads to a change in the magnetic phase shift between magnetic fields H40, H41. The resulting magnetic field HR takes on a value less than the initial value represented in FIG. 4a. When the torque shift corresponds to a phase shift equal to a half-period (S=P/2), the magnetic field HR is zero.

When the torque is zero, torque rod 11 elastically returns shafts 10, 12 to their initial positions, and the resulting induction field HR returns to its initial value.

Figure 5:
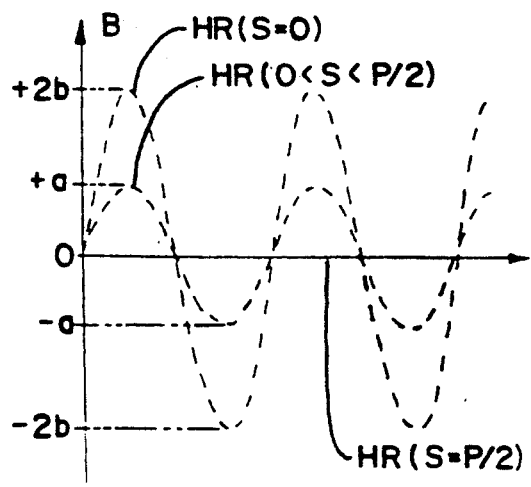
FIG. 5 is a diagram of the resulting field showing different torque values.

FIG. 5 shows the change in the resulting magnetic field HR for three torsional moments with an initial adjustment at which S=0 prior to application of the torque. When no torque is applied, magnetic field HR retains its peak value of $+2b$, as shown in FIG. 4a. The application of an intermediate torque produces a relative rotation of encoders 40, 41 and is represented by a phase shift $0<S<P/2$ of magnetic fields H40, H41, the resulting field HR takes on a peak value (+a) of less than $(+2b)$. The application of a torque up to the limit of the measurement capability of the device leads to a relative rotation of encoders 40, 41 and a phase shift of magnetic fields H40, H41 with a phase shift $S=P/2$. The resulting field HR then takes on a value of zero.

The peak value (a) of magnetic field HR can assume any magnitude between $+2b$ and 0 in proportion to S, such as $0<S<P/2$. The value of S depends only on the torque applied to torque rod 11 by means of input shaft 10 and output shaft 12. The relationship between the value of the torque applied and the phase shift S depends on the physical characteristics and torsional rigidity of torque rod 11.

Figure 6:
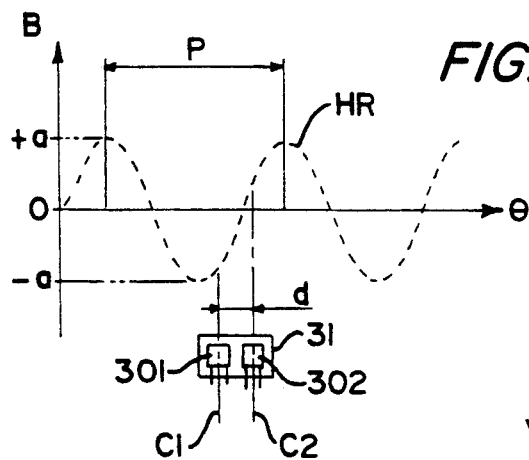
FIG. 6 is a simplified view of the sensing device in the resulting magnetic field.

Sensing means 31 consists of two identical Hall-effect or magnetoresistor sensing elements 301, 302 and delivers output voltages proportional to the magnetic field HR sensed. As indicated in FIG. 6, centers C1, C2 of sensing elements 301, 302 are situated in quadrature in relation to the sinusoidal magnetic field HR, that is, at a distance "d" from one another such that they sense different phases of the field. The distance "d" is such that the phase difference $\Theta$ is defined by the equation "n" is a positive whole number or zero.

Figure 7:
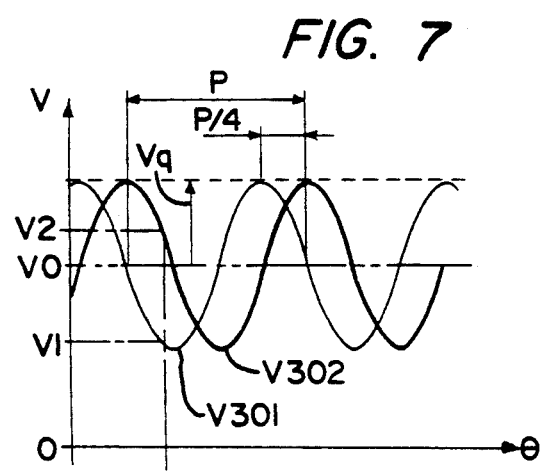
FIG. 7 shows a curve of the changes in the output signal as a function of the angular displacement of the shaft.

FIG. 7 shows the change in the signal representing the torque measured on a rotating shaft. For a constant torque exerted on torque rod 11, accompanied by an angular rotation $\Theta$ of input shaft 10, by torque rod 11 and output shaft 12, electric voltage signals V301 and V302 are delivered by each of the sensing elements 301, 302. The amplitude of these signals in relation to a constant voltage $V_o$ is proportional to the value of magnetic field HR which passes through each of the elements. The signals are of the same amplitude, have the same variations and have the same period P as the sinusoidal magnetic field HR, and are 90° out of phase with one another. The signals are centered on a value $V_o$ which corresponds to the voltage delivered by the sensing elements 301, 302 in the absence of a magnetic field.

For a value $V_1$ of signal V301 and a value $V_2$ of signal V302 which correspond to an angle $\Theta$, the quadratic mean defined by the equation $V_q = [(V_1 - V_0)^2 + (V_2 - V_0)^2]^{\frac{1}{2}}$ is independent of $\Theta$, the simultaneous angle of rotation of shafts 10 and 12. Therefore, the quadratic mean $V_q$ depends only on the amplitude of signals V301, V302, and thus on the peak value of magnetic field HR and the value of the torque ($M_t$) applied between input shaft 10 and output shaft 12.

It should be noted that, knowing the value of $V_0$, we can obtain $V_q$ directly by measuring voltages $V_1$, $V_2$, and by using known electronic or data processing methods indicated generally by reference numeral 50. This value $V_q$ is shown in FIG. 7 with $V_0$ as the origin.

Figure 8:
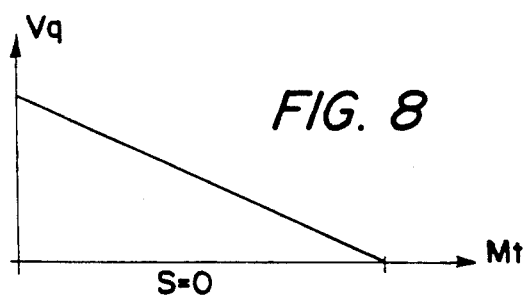
FIGS. 8 and 9 are diagrams of the changes in the output signal as a function of the variations of the torque for two sensor angular displacements.

The relationship between $V_q$ and the torque $M_t$ applied to shaft 11 for an initial magnetic phase shift adjustment of 0 is shown in FIG. 8. $V_q$ then varies in inverse proportion to the applied torque.

Figure 9:
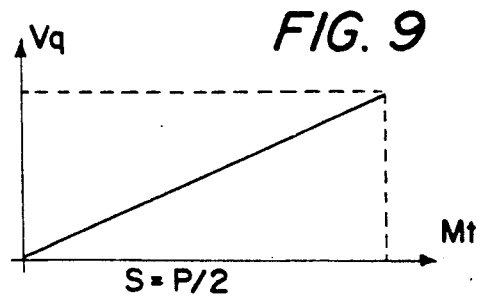

When the initial magnetic phase shift is set at a value $S=P/2$, $V_q$ then varies in direct proportion to the applied torque, as shown in FIG. 9.

According to the invention, the sensing device is situated between the two magnets and has two elements for detecting sinusoidal magnetic fields generated by the magnets, the centers of which are angularly out of phase by a distance equal to one-fourth of the period of the sinusoidal magnetic fields.

Another goal of the invention is to provide a device of simple and economical construction which permits the measurement of small angles of torsion.

Having thus described the invention what is claimed is:

1. A device for measuring speed of a shaft and torque applied to the shaft, the device comprising:
   encoder means for producing a sinusoidal magnetic field having a periodicity (P), said encoder means comprising first and second encoders fixed to said shaft, the encoders being axially separated; and
   a sensing means for sensing different phases of said sinusoidal magnetic field, said sensing means comprising a pair of sensing elements, the sensing elements being angularly displaced one from the other whereby said phases are separated by an angle $\Theta = (2n+1)P/4$, n being zero or a positive whole number.

2. A device according to claim 1 wherein the shaft is comprised of two sections connected by an elastically deformable torque rod.

3. A device according to claim 1 wherein said encoders are multipolar magnets.

4. A device for measuring the torque applied to a shaft, said device comprising:
   sensing means comprising first and second sensing elements;
   first and second encoders fixed to said shaft and generating sinusoidal magnetic fields having a periodicity (P);

said first and second sensing elements each sensing a magnetic field resulting from the magnetic fields generated by both said first and second encoders;

said first and second sensing elements being displaced relative to each other and said resulting magnetic field whereby said first sensing element produces a first sinusoidal output signal which leads a second sinusoidal output signal produced by said second sensing element;

said first and second sensing elements being positioned relative to said resulting magnetic field such that the first sinusoidal output signal leads the second sinusoidal output signal by an angle ($\Theta$) where $\Theta = (2n+1)P/4$ and n is zero or a positive whole number; and response means responsive to the concurrent magnitudes of said first and second output signals for determining the torque applied to said shaft.

5. A device as claimed in claim 4 wherein the means for determining torque comprises means for determining the square root of the sum of the squares of the magnitudes of said first and second signals.

6. A device as claimed in claim 5 wherein said shaft comprises two sections connected by a deformable torque rod.

7. A device according to claim 4 wherein said first and second sensing elements are positioned relative to said resulting magnetic field such that the first sinusoidal output signal leads the second sinusoidal output signal by an angle ($\Theta$) where $\Theta = (2n+1)P/4$ and n is zero or a positive whole number and said sinusoidal magnetic fields are out of phase by $P/2$ with respect to each other when no torque is applied to the shaft.

8. A device as claimed in claim 7 wherein the means for determining torque comprises means for determining the square root of the sum of the squares of the magnitudes of said first and second signals.

9. A device as claimed in claim 8 wherein said shaft comprises two sections connected by a deformable torque rod.

* * * * *